(12) United States Patent
Kobayashi (10) Patent No.: US 8,212,937 B2
(45) Date of Patent: Jul. 3, 2012

(54) VIDEO PROCESSING APPARATUS

(75) Inventor: Mamoru Kobayashi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 12/857,335

(22) Filed: Aug. 16, 2010

(65) Prior Publication Data

US 2011/0063515 A1   Mar. 17, 2011

(30) Foreign Application Priority Data

Sep. 15, 2009   (JP) .................. 2009-213619

(51) Int. Cl.
*H04N 5/21* (2006.01)
(52) U.S. Cl. ........................ 348/625; 348/672
(58) Field of Classification Search .......... 348/625, 348/630, 631, 672; 382/254, 255, 260–266, 382/274, 275; *H04N 5/21, 5/14*
See application file for complete search history.

(56) References Cited

U.S. PATENT DOCUMENTS

| 6,771,319 B2 | 8/2004 | Konuma |
| 7,995,146 B2 | 8/2011 | Tomonaga |
| 2009/0128703 A1* | 5/2009 | Uchiyama et al. ............ 348/630 |
| 2009/0172754 A1 | 7/2009 | Furukawa |
| 2010/0110300 A1* | 5/2010 | Ueno et al. .................... 348/625 |

FOREIGN PATENT DOCUMENTS

| JP | 2000013595 | 1/2000 |
| JP | 2001-189851 | 7/2001 |
| JP | 2002-064761 | 2/2002 |
| JP | 2003-338991 | 11/2003 |
| JP | 2008-067316 | 3/2008 |
| JP | 2008-228251 | 9/2008 |
| JP | 2009-010819 | 1/2009 |
| JP | 2009-117886 | 5/2009 |
| JP | 4521468 | 8/2010 |

* cited by examiner

*Primary Examiner* — Sherrie Hsia
(74) *Attorney, Agent, or Firm* — Blakely, Sokoloff, Taylor & Zafman LLP (57) ABSTRACT

According to one embodiment, a video processing apparatus includes a histogram generator, a determination module and a sharpening processor. The histogram generator generates a histogram based on a luminance level of pixels of a video signal. The determination module determines whether the video signal is a captured video based on the histogram. The sharpening processor sharpens the video signal based on an imaging model function in which a blur due to imaging is not considered, if the video signal is not the captured video.

13 Claims, 8 Drawing Sheets

VIDEO PROCESSING APPARATUS

CROSS-REFERENCE TO RELATED APPLICATIONS

This application is based upon and claims the benefit of priority from Japanese Patent Application No. 2009-213619, filed Sep. 15, 2009; the entire contents of which are incorporated herein by reference.

FIELD

Embodiments described herein relate generally to a video processing apparatus having an image quality processing function.

BACKGROUND

In recent years, there have been an increasing number of opportunities at which video contents are viewed on displays for personal computers, which have resolutions exceeding the resolution of the standard-resolution video (Standard Definition (SD) video: 480×480~720×480). In addition, with the full-scale implementation of Hi-Vision broadcast, television receivers, which are adaptive to sub-high-resolution video (1440×1080) and high-resolution video (Full High Definition (full HD) video: 1920×1080), have been prevailing in home. Accordingly, up-convert techniques have been proposed for converting SD video, such as DVD video, or quasi-high-resolution video of, e.g. terrestrial digital broadcast, to high-resolution video.

Jpn. Pat. Appln. KOKAI Publication No. 2001-189851 discloses an image processing apparatus which can obtain a high image-quality image without an interpolation blur or jaggy, when a low-resolution image is converted to a high-resolution image. According to this image processing apparatus, even if an artificially created character/line image and a natural image are mixed in an image, it is possible to generate an image in which edges of the character/line image portion are reproduced and an interpolation blur in the natural image portion is suppressed.

In the meantime, an imaging blur due to the characteristics of an imaging device, a lens, etc., may occur in a video captured by using a video camera. To cope with this problem, there has been proposed an image quality processing technique for suppressing an imaging blur by subjecting the captured video to an image quality enhancing process which uses a point spread function (PSF) as an imaging model function.

However, the video content of, e.g. a television broadcast program includes videos which are different in characteristic. For example, a captured video and a graphics video such as an animation or a computer graphics are present. No imaging blur occurs in the graphics video. Thus, if the image quality enhancing process using the PSF is executed on the graphics video contents, degradation may occur in the image quality of the graphics video contents.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a video processing apparatus includes a histogram generator, a determination module and a sharpening processor. The histogram generator generates a histogram based on a luminance level of pixels of a video signal. The determination module determines whether the video signal is a captured video based on the histogram. The sharpening processor sharpens the video signal based on an imaging model function in which a blur due to imaging is not considered, if the video signal is not the captured video.

Figure 1:
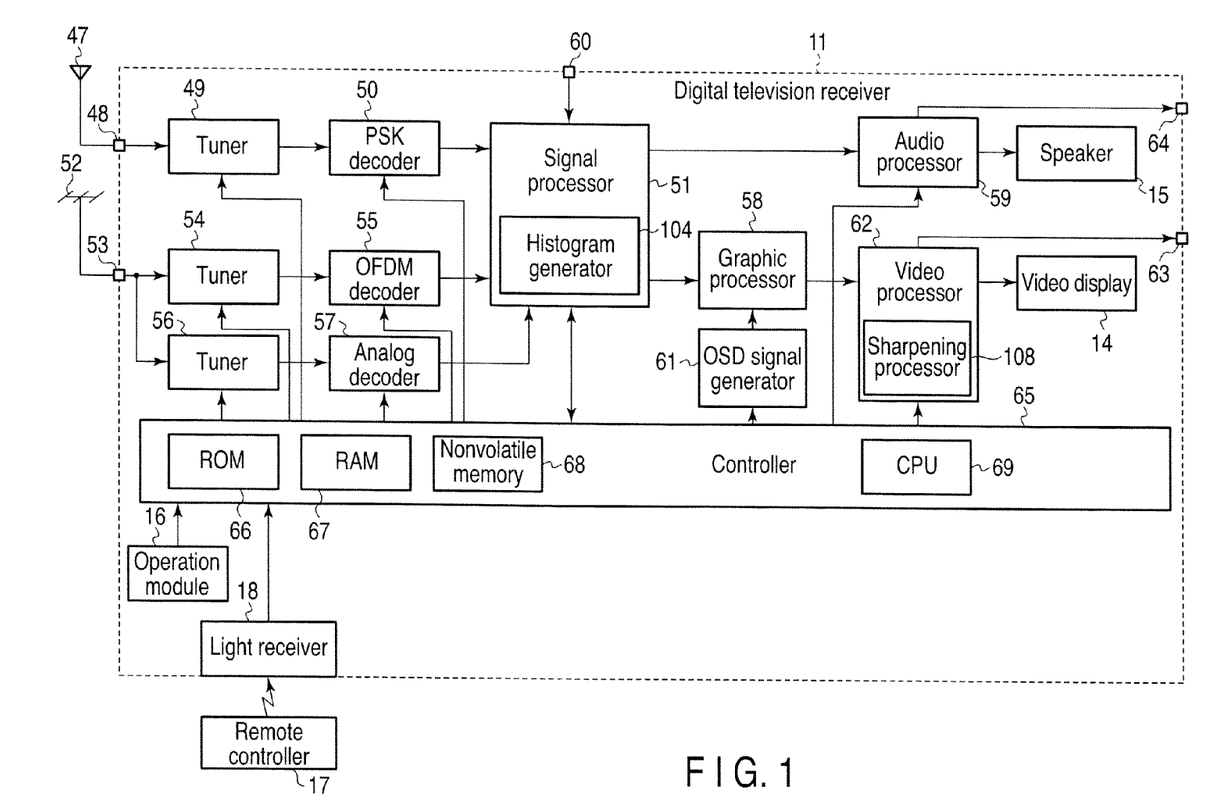
FIG. 1 is an exemplary block diagram showing the structure of a video processing apparatus according to an embodiment.

To begin with, referring to FIG. 1, a description is given of a digital television receiver 11 as an example of a video processing apparatus according to an embodiment.

The digital television receiver 11 includes a video display 14, a speaker 15, an operation module 16, a right receiver 18, broadcast signal input terminals 48 and 53, an analog signal input terminal 60, output terminals 63 and 64, tuners 49, 54 and 56, a PSK decoder 50, an OFDM decoder 55, an analog decoder 57, a signal processor 51, an audio processor 59, a graphic processor 58, a video processor 62, an OSD signal generator 61, and a controller 65.

A BS/CS digital broadcast receiving antenna 47 and a terrestrial broadcast receiving antenna 52 are connected to the broadcast signal input terminal 48 and broadcast signal input terminal 53, respectively. The right receiver 18 receives a signal from a remote controller 17.

The controller 65 controls the operations of the respective components in the digital television receiver 11. The controller 65 includes a CPU 69, a ROM 66, a RAM 67, and a nonvolatile memory 68. The ROM 66 stores a control program executed by the CPU 69. The nonvolatile memory 68 stores various setting information and control information. The CPU 69 loads instructions and data, which are necessary for processes, in the RAM 67, and executes the processes.

The controller 65 receives operation information from the operation module 16, or operation information from the remote controller 17, which is received by the right receiver 18. The controller 65 executes control of the respective components, with the contents of the operation information being reflected on the control.

The BS/CS digital broadcast receiving antenna 47 receives a satellite digital television broadcast signal. The BS/CS digital broadcast receiving antenna 47 outputs the received satellite digital television broadcast signal to the tuner 49 for satellite digital broadcast via the input terminal 48. The tuner 49 selects, from this broadcast signal, a broadcast signal of a channel selected by the user. The tuner 49 outputs the selected broadcast signal to the phase shift keying (PSK) decoder 50. The PSK decoder 50 decodes the broadcast signal, which is selected by the tuner 49, to a digital video signal and audio signal. The PSK decoder 50 outputs the decoded digital video signal and audio signal to the signal processor 51.

The terrestrial broadcast receiving antenna 52 receives a terrestrial digital television broadcast signal and a terrestrial analog television broadcast signal. The terrestrial broadcast receiving antenna 52 outputs the terrestrial digital television broadcast signal to the tuner 54 via the input terminal 53. The tuner 54 selects, from this broadcast signal, a broadcast signal of a channel selected by the user. The tuner 54 outputs the selected broadcast signal to the orthogonal frequency division multiplexing (OFDM) decoder 55. The OFDM decoder 55 decodes the broadcast signal, which is selected by the tuner 54, to a digital video signal and audio signal. The OFDM decoder 55 outputs the decoded digital video signal and audio signal to the signal processor 51.

In addition, the terrestrial broadcast receiving antenna 52 outputs the terrestrial analog television broadcast signal to the tuner 56 for terrestrial analog broadcast via the input terminal 53. The tuner 56 selects, from this broadcast signal, a broadcast signal of a channel selected by the user. The tuner 56 outputs the selected broadcast signal to the analog decoder 57. The analog decoder 57 decodes the broadcast signal, which is selected by the tuner 56, to an analog video signal and audio signal. The analog decoder 57 outputs the decoded analog video signal and audio signal to the signal processor 51.

The input terminal 60 is connected to the signal processor 51. The input terminal 60 is a terminal for putting an analog video signal and audio signal from the outside to the digital television receiver 11. The signal processor 51 converts an analog video signal and audio signal, which are input from the analog decoder 57 or input via the input terminal 60, to a digital video signal and audio signal.

The signal processor 51 executes a predetermined digital signal process on the converted digital video signal and audio signal, and on the digital video signal and audio signal which are input from the PSK decoder 50 or OFDM decoder 55. The signal processor 51 outputs the video signal and audio signal, which have been subjected to the predetermined digital signal process, to the graphic processor 58 and audio processor 59.

The graphic processor 58 superimposes an on-screen display (OSD) signal of, e.g. a menu, which is generated by the on-screen display (OSD) signal generator 61, on the digital video signal which is output from the signal processor 51. The graphic processor 58 outputs the video signal, on which the OSD signal is superimposed, to the video processor 62. The graphic processor 58 may selectively output either the video signal that is the output of the signal processor 51, or the OSD signal that is the output of the OSD signal generator 61.

The video processor 62 converts the input digital video signal to an analog video signal which can be displayed on the video display 14. The video processor 62 outputs the analog video signal to the video display 14. Based on the input analog video signal, the video display 14 displays video. The video processor 62 may also output the analog video signal to the outside via the output terminal 63.

The audio processor 59 converts the input digital audio signal to an analog audio signal which can be reproduced by the speaker 15. The audio processor 59 outputs the analog audio signal to the speaker 15. Based on the input analog audio signal, the speaker 15 reproduces audio. The audio processor 59 may also output the analog audio signal to the outside via the output terminal 64.

The signal processor 51 includes a histogram generator 104. The video processor 62 includes a sharpening processor 108. A luminance signal (Y) 101*a*, which is included in a video signal that is to be processed, is input to the histogram generator 104 in the signal processor 51. The histogram generator 104 generates a histogram based on the luminance signal (Y) 101*a*. The histogram generator 104 generates a histogram from the luminance signal (Y) 101*a*, and generates, based on the generated histogram, a parameter which is used for the sharpening by the sharpening processor 108. In the video processor 62, the video signal 101 is input to the sharpening processor 108. Based on the parameter generated by the histogram generator 104, the sharpening processor 108 sharpens the video signal 101.

Figure 2:
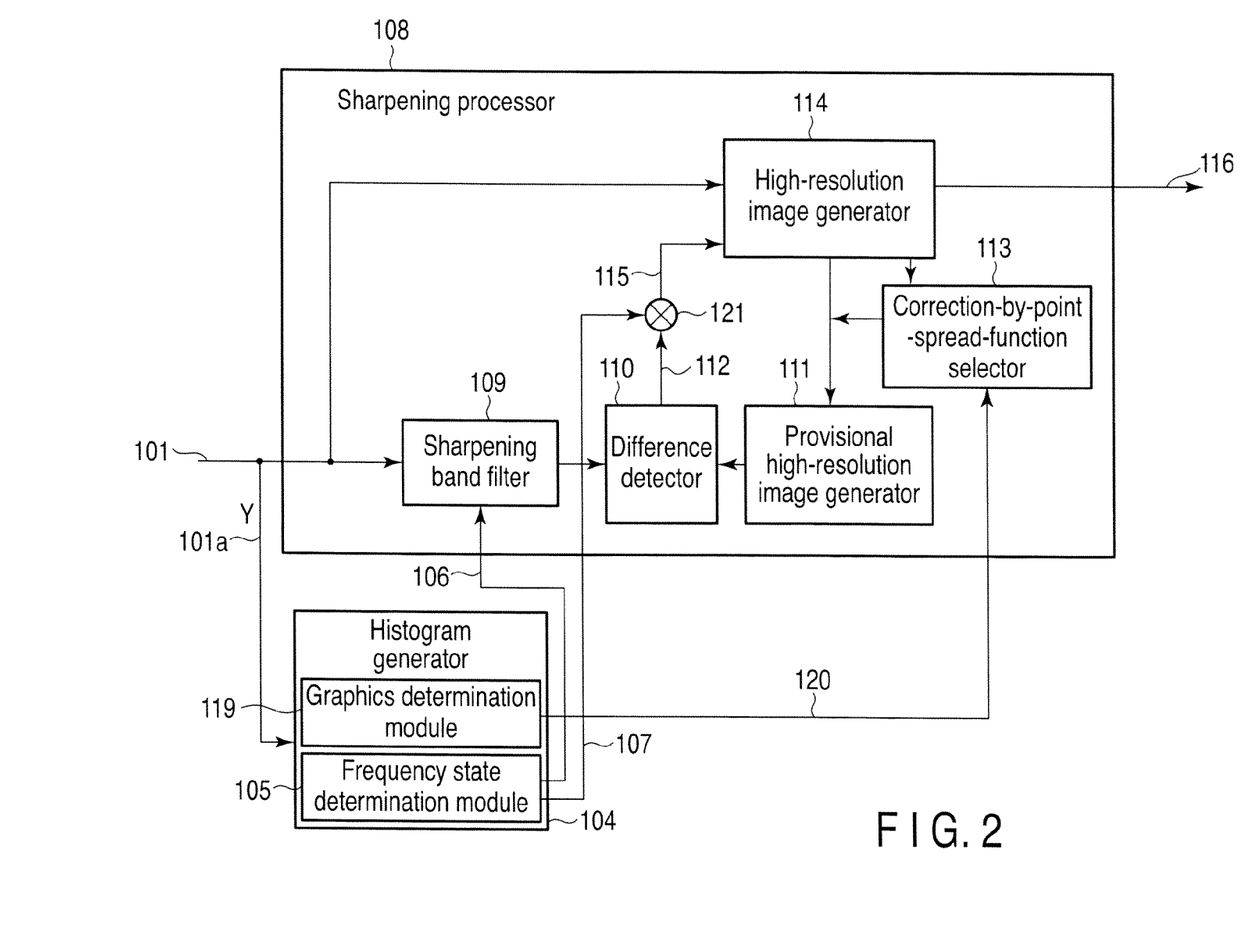
FIG. 2 is an exemplary block diagram showing the structure of a sharpening processor and a histogram generator in the video processing apparatus according to the embodiment.

FIG. 2 is a block diagram showing the structure of the histogram generator 104 and sharpening processor 108.

In response to the input of the luminance signal (Y) 101*a* of video, the histogram generator 104 starts processing. The histogram generator 104 generates a histogram based on the luminance level of pixels of the video signal. Specifically, the histogram generator 104 calculates the numbers of pixels for the respective luminance levels with respect to each of video frames. In the description below, it is assumed that the luminance level is divided into an n-number of divisions. The division number n of luminance levels is set to be sufficiently fine (e.g. n=256). The number of pixels at each luminance level is expressed by DIN(i). The symbol "i" represents the luminance level, and can take a value in the range of 0 to n.

The histogram generator 104 includes a graphics determination module 119 and a frequency state determination module 105. The graphics determination module 119 determines, based on the calculated number of pixels (histogram) at each luminance level, the characteristic of the input video signal, for example, whether the video signal is a captured video or a graphics video. The captured video is a video image captured by using, e.g. a video camera. The graphics video is a video image using animation, CG, etc.

Figure 3:
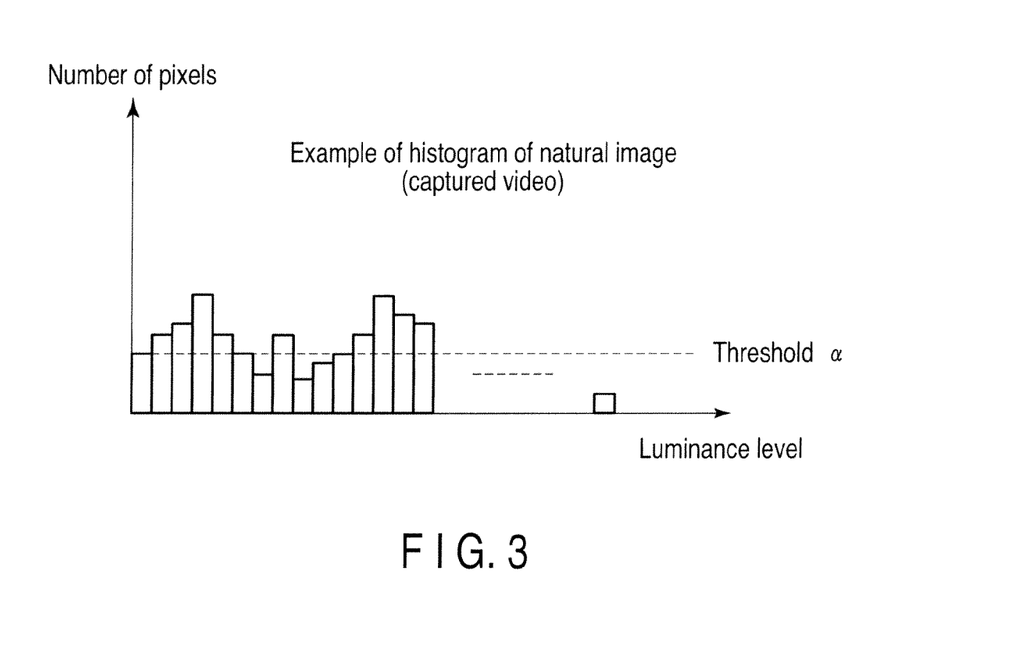
FIG. 3 shows an example of a histogram of a captured video input to the video processing apparatus according to the embodiment.
Figure 4:
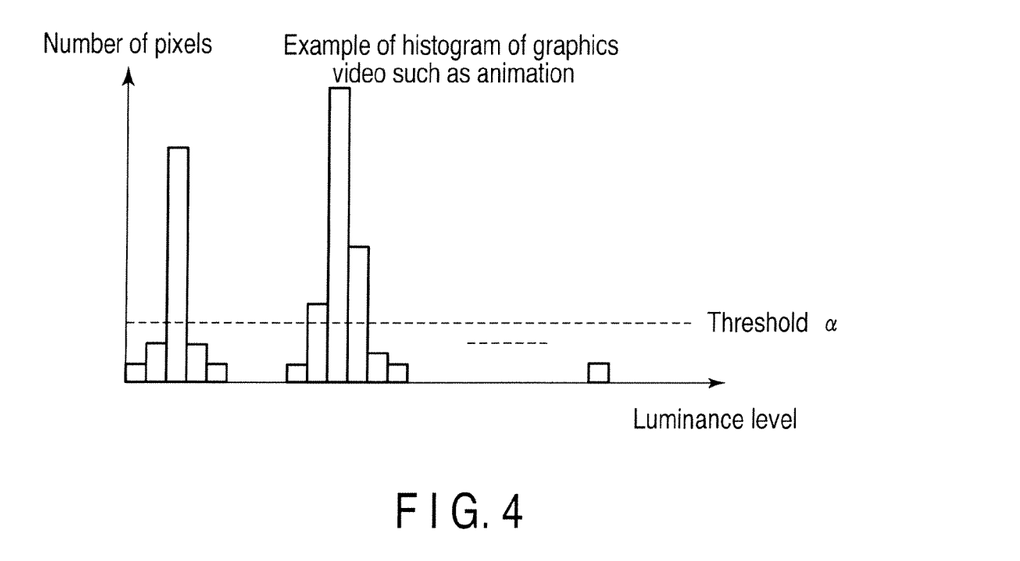
FIG. 4 shows an example of a histogram of a graphics video input to the video processing apparatus according to the embodiment.

The histogram exhibits different tendencies depending on the characteristic of the input video signal. FIG. 3 and FIG. 4 show, respectively, an example of the histogram of a video frame of captured video and an example of the histogram of a video frame of graphics video.

As shown in FIG. 3, the video frame of captured video has such a tendency that the numbers of pixels at respective luminance levels are gently distributed. In other words, in the video frame of captured video, the numbers of pixels at respective luminance levels vary continuously. Thus, the probability is low that the number of pixels sharply varies between neighboring luminance levels.

As shown in FIG. 4, the video frame of graphics video has such a tendency that the numbers of pixels at respective luminance levels are locally distributed at respective peaks. In other words, in the video frame of graphics video, the numbers of pixels at respective luminance levels vary discretely. Thus, the probability is high that the number of pixels sharply varies between neighboring luminance levels.

Figure 5:
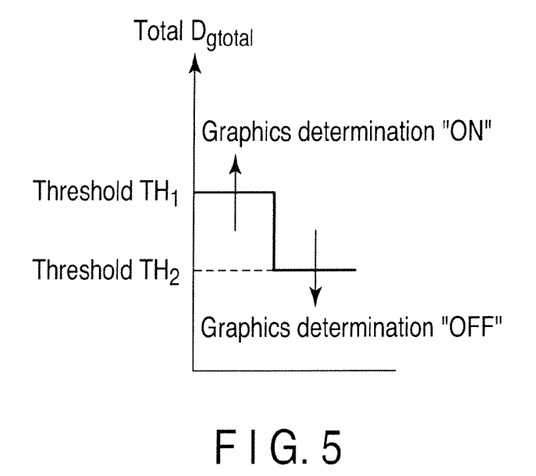
FIG. 5 is an exemplary view for explaining an example of determination by a graphics determination module in the histogram generator shown in FIG. 2.

The graphics determination module 119 determines whether the input video signal is a graphics video, by making use of the above-described feature, that is, the tendency of the histogram. The graphics determination module 119 calculates the absolute value of a difference between the numbers of pixels of neighboring luminance levels, and calculates the sum of the calculated absolute values of differences. The graphics determination module 119 determines whether the input video signal is a graphics video based on the sum. From the above-described characteristic, it is highly possible that the calculated sum has a small value for a captured video and has a large value for a graphics video. Thus, as shown in FIG. 5, the graphics determination module 119 determines that the video signal is a graphics video (graphics determination being "ON") if the calculated sum is greater than a first threshold value $TH_1$, and determines that the video signal is a captured video (graphics determination being "OFF") if the calculated sum is less than a second threshold value $TH_2$. By executing the determination with use of these two threshold values, the instability in the determination can be reduced when the calculated sum has a value close to a threshold. In other words, by executing the determination with use of two thresholds, the graphics determination module 119 has hysteresis characteristics.

Next, a description is given of a concrete determination method by the graphics determination module 119.

To begin with, the graphics determination module 119 calculates a value by subtracting a threshold $\alpha$ from the calculated number of pixels, DIN(i), at each luminance level, by the following equation:

$$DIN(i)=DIN(i)-\alpha.$$

If DIN(i) calculated by the above equation is less than zero, $$DIN(i)=0.$$

The subtraction using the threshold $\alpha$ is executed in order to reduce the influence of a noise component in the video signal.

Then, the graphics determination module 119 calculates the absolute value of a difference between the calculated values DIN(i) at neighboring luminance levels. The graphics determination module 119 calculates a sum $D_{gtotal}$ of absolute differences between the calculated values DIN(i) at the respective luminance levels. Specifically, the graphics determination module 119 calculates $D_{gtotal}$ by the following equation:

$$D_{gtotal} = \sum_{i=1}^{n-1} |DIN(i) - DIN(i+1)|.$$

Subsequently, based on the calculated $D_{gtotal}$, the graphics determination module 119 determines whether the video signal is a captured video or graphics video. If $D_{gtotal}$ is greater than the threshold $TH_1$, the graphics determination module 119 sets the graphics determination to be "ON". If $D_{gtotal}$ is less than the threshold $TH_2$, the graphics determination module 119 sets the graphics determination to be "OFF". By executing the determination with use of the two threshold values, namely, the first threshold $TH_1$ and second threshold $TH_2$, the instability in the determination can be reduced when the calculated sum has a value close to a threshold, as described above.

The first threshold $TH_1$ and second threshold $TH_2$ are calculated in the following manner. To begin with, a threshold TH, in which no consideration is given to hysteresis characteristics, is calculated. The threshold TH is, e.g. 1/16 of the number of pixels of the video frame that is the target of the process. Accordingly, for example, if the video frame that is the target of the process is 1920 pixels×1080 pixels, the threshold TH is calculated to be 1920×1080/16=129600. The first threshold $TH_1$ and second threshold $TH_2$ are determined based on the calculated threshold TH, with consideration being given to the hysteresis characteristics. Thus, a value, which is calculated by adding a predetermined value to the threshold TH, for example, is set for the first threshold $TH_1$. In addition, a value, which is calculated by subtracting a predetermined value from the threshold TH, for example, is set for the second threshold $TH_2$.

The graphics determination module 119 outputs a control parameter 120, which is indicative of ON/OFF of the graphics determination, to a correction-by-point-spread-function selector 113. The determination result by the graphics determination module 119 may be used not only in the sharpening processor 108, but also in the respective components in the digital television receiver 11.

The frequency state determination module 105 detects the frequency state of the input luminance signal (Y) 101a by using the histogram of each frame, which is generated by the histogram generator 104. Specifically, based on the frequency distribution of the luminance signal (Y) 101a, the frequency state determination module 105 generates a filter control parameter 106 for extracting from the video signal a component that is to be subjected to sharpening, and a sharpening effect control parameter (sharpening effect gain/minute signal coring control signal) 107 for determining the sharpening effect. The frequency state determination module 105 outputs the calculated filter control parameter 106 to a sharpening band filter 109, and outputs the sharpening effect control parameter 107 to a parameter adjuster 121.

The sharpening processor 108 includes the sharpening band filter 109, a difference detector 110, a provisional high-resolution image generator 111, correction-by-point-spread-function selector 113, a high-resolution image generator 114, and parameter adjuster 121. Responding to the input of the video signal 101 including the luminance signal (Y) 101a, the sharpening processor 108 executes the sharpening process on the video signal 101.

Based on the filter control parameter 106 which is input from the frequency state determination module 105, the sharpening band filter 109 extracts from the video signal 101 an AC component that is to be subjected to sharpening. The sharpening band filter 109 extracts, for example, a texture part that is the target of sharpening, from among a texture part with a fine pattern or the like, an edge part with a line or a boundary, and a flat part such as a background, which are included in the video signal 101. The sharpening band filter 109 outputs the extracted AC component to the difference detector 110.

Based on the control parameter 120 input from the graphics determination module 119, the correction-by-point-spread-function selector 113 selects a point spread function (imaging model function) for correction. Specifically, if the control parameter 120 is indicative of "OFF" of the graphics determination (if the video signal is determined to be a captured video), the correction-by-point-spread-function selector 113 sets a point spread function, in which an imaging blur is considered, for the imaging model function for correction. On the other hand, if the control parameter 120 is indicative of "ON" of the graphics determination (if the video signal is determined to be a graphics video), the correction-by-point-spread-function selector 113 sets a point spread function, in which an imaging blur is not considered, for the imaging model function for correction. Specifically, based on "ON" or "OFF" of the graphics determination indicated by the control parameter 120, the correction-by-point-spread-function selector 113 switches between the point spread function, in which an imaging blur is considered, and the point spread function, in which an imaging blur is not considered, and selectively sets one of them for the imaging model function.

Figure 6:
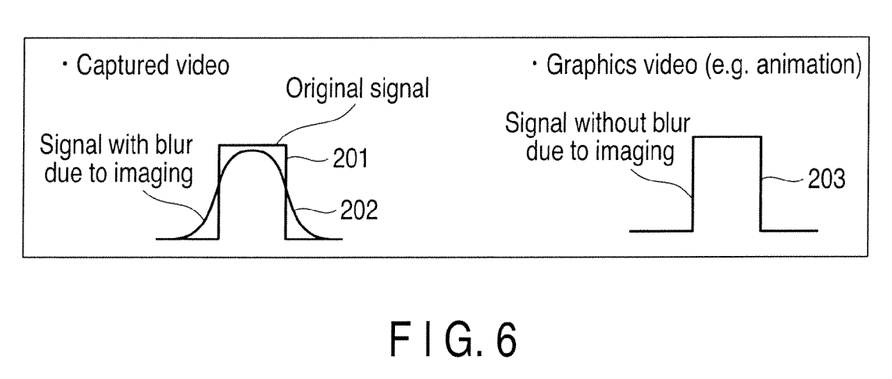
FIG. 6 is an exemplary view for explaining examples of imaging model functions of a captured video and a graphics video, which are used in the video processing apparatus according to the embodiment.

FIG. 6 shows examples of the imaging model functions for a captured video and a graphics video, respectively.

In the video signal of captured video, an imaging blur occurs due to the characteristics of the imaging device, lens, etc. of the camera (video camera) for imaging. Specifically, the camera captures not an original signal 201 without blur, but a point-spread signal 202 with a blur due to imaging. Thus, the point spread function, which is based on the point-spread signal 202 with a blur due to imaging, is used for the imaging model function for the captured video.

On the other hand, no imaging blur occurs in the video signal of graphics video since it is created by animation or CG. Thus, a flat point spread function, which is based on a signal 203 without blur due to imaging, is used for the imaging model function for the graphics video.

As has been described above, by setting the point spread functions with optimal characteristics for the imaging model functions with respect to a captured video and a graphics video, it becomes possible to generate video images which have been subjected to proper image quality processes.

The provisional high-resolution image generator 111 generates a provisional high-resolution image which is obtained by correcting the image, which is output from the high-resolution image generator 114, based on the imaging model function set by the correction-by-point-spread-function selector 113. The provisional high-resolution image generator 111 outputs the generated provisional high-resolution image to the difference detector 110.

The difference detector 110 generates a difference parameter 112 indicative of a difference between the provisional high-resolution image, which is generated by the provisional high-resolution image generator 111, and the AC component which is extracted by the sharpening band filter 109. The difference detector 110 outputs the generated difference parameter 112 to the parameter adjuster 121. In the meantime, the difference detector 110 may generate, as the difference parameter 112, the difference between the input video signal (original video signal) and the provisional high-resolution image generated by the provisional high-resolution image generator 111.

The parameter adjuster 121 adjusts the difference parameter 112, which is generated by the difference detector 110, by using the sharpening effect control parameter 107 which is generated by the frequency state determination module 105, and generates a parameter 115. Specifically, using the sharpening effect control parameter 107, the parameter adjuster 121 executes optimization control of the sharpening effect gain and minute signal coring for the difference parameter 112. The parameter adjuster 121 outputs the generated parameter 115 to the high-resolution image generator 114.

The high-resolution image generator 114 adds the parameter 115 to the original video signal 101. The high-resolution image generator 114 outputs a video signal 116 sharpened by the above-described process.

In the meantime, the sharpening process may be repeatedly executed on one video frame. The sharpening process is repeated, for example, until the difference parameter 112, which is detected by the difference detector 110, decreases to a threshold or less. By repeating the sharpening process, a high-resolution image with high precision can be generated.

Figure 7:
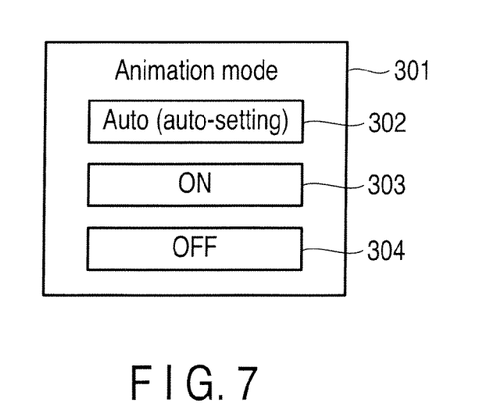
FIG. 7 shows an example of an animation mode setting screen displayed by the video processing apparatus according to the embodiment.

Besides, by the input using the operation module 16 or remote controller 17, the user may execute setting as to whether the video signal that is input (the video content to be viewed) is a captured video or a graphics video. FIG. 7 shows an example of an animation mode select screen displayed on the video display 14.

The animation mode select screen 301 includes an auto (auto-setting) button 302, an ON button 303 and an OFF button 304. The user selects one of the three buttons through the animation mode select screen 301.

When the auto (auto-setting) button 302 is selected, the graphics determination module 119 determines, based on the histogram, whether the input video signal is a captured video or a graphics video. The correction-by-point-spread-function selector 113 selects the imaging model function based on the determination result. Specifically, if the input video signal is a captured video, the correction-by-point-spread-function selector 113 sets a point spread function, in which an imaging blur is considered, for the imaging model function. If the input video signal is a graphics video, the correction-by-point-spread-function selector 113 sets a point spread function in which no imaging blur is considered (i.e. a point spread function for flat correction) for the imaging model function.

If the ON button 303 is selected, the correction-by-point-spread-function selector 113 sets a point spread function in which no imaging blur is considered (i.e. a point spread function for flat correction) for the imaging model function. If the OFF button 304 is selected, the correction-by-point-spread-function selector 113 sets a point spread function, in which an imaging blur is considered, for the imaging model function. If the ON button 303 or OFF button 304 is selected, the same parameter as the control parameter 120, which is indicative of "ON" or "OFF" of the graphics determination, is input to the correction-by-point-spread-function selector 113. The correction-by-point-spread-function selector 113 switches the imaging model function, as described above, in accordance with the input parameter.

As has been described above, if the auto button 302 is selected, whether the input video signal is a captured video or a graphics video can automatically be determined by the graphics determination module 119. If the ON button 303 or OFF button 304 is selected, "ON" or "OFF" of the graphics determination can manually be set.

The graphics determination module 119 may determine whether the input video signal is a captured video or a graphics video, by using EPG information (program information) added to the input video signal. The EPG information includes, for instance, genre information of video content (program). For example, if the video content is an animation program, the EPG information includes genre information which is indicative of "animation". For example, if the video content is a news program, the EPG information includes genre information which is indicative of "news".

For example, if the genre information in the EPG information is indicative of "animation" (i.e. if the genre information indicates that the input video content (input video signal) is an animation program), the graphics determination module 119 varies the threshold $TH_1$ or $TH_2$ in FIG. 5, or both of $TH_1$ and $TH_2$, such that the determination is facilitated to determine as "ON", and then executes the determination using the varied thresholds. For example, if the genre information in the EPG information is indicative of "news" (i.e. if the genre information indicates that the input video content (input video signal) is a news program), the graphics determination module 119 varies the threshold $TH_1$ or $TH_2$ in FIG. 5, or both of $TH_1$ and $TH_2$, such that the determination is facilitated to determine as "OFF", and then executes the determination using the thresholds. In short, based on the genre information, the graphics determination module 119 varies the thresholds $TH_1$, $TH_2$, for determining whether the input video signal is a captured video or a graphics video.

As has been described above, based on the calculated $D_{gtotal}$ and the threshold $TH_1$ and $TH_2$, the graphics determination module 119 determines whether the input video signal is a captured video or a graphics video. If $D_{gtotal}$ is greater than the threshold $TH_1$, the graphics determination module 119 sets the graphics determination to be "ON". If $D_{gtotal}$ is less than the threshold $TH_2$, the graphics determination module 119 sets the graphics determination to be "OFF".

When the genre information (EPG information) is further considered in this determination, if the genre information is indicative of the genre corresponding to a graphics video such as "animation", the graphics determination module 119 sets the threshold $TH_1$ or $TH_2$, or both of $TH_1$ and $TH_2$, at low levels. The graphics determination module 119 executes determination based on the low-level thresholds. Accordingly, if the genre information is indicative of the genre corresponding to a graphics video such as "animation", the input video signal tends to be easily determined to be a graphics video (graphics determination being "ON").

If the genre information is indicative of the genre corresponding to a captured video such as "news", the graphics determination module 119 sets the threshold $TH_1$ or $TH_2$, or both of $TH_1$ and $TH_2$, at high levels. The graphics determination module 119 executes determination based on the high-level thresholds. Accordingly, if the genre information is indicative of the genre corresponding to a captured video such as "news", the input video signal tends to be easily determined to be a captured video (graphics determination being "OFF").

As has been described above, using the luminance histogram of the input video signal and the EPG information that is added to the input video signal, it is determined whether the input video signal is a captured video or a graphics video. Thereby, it is possible to execute the determination with higher precision than in the case of executing the determination with use of either the luminance histogram or the EPG information.

Based on the result of graphics determination based on the EPG information and the histogram, the correction-by-point-spread-function selector 113 changes the imaging model function. In the meantime, the graphics determination module 119 may determine whether the input video signal is a captured video or a graphics video, based on either the EPG information or the histogram.

Figure 8:
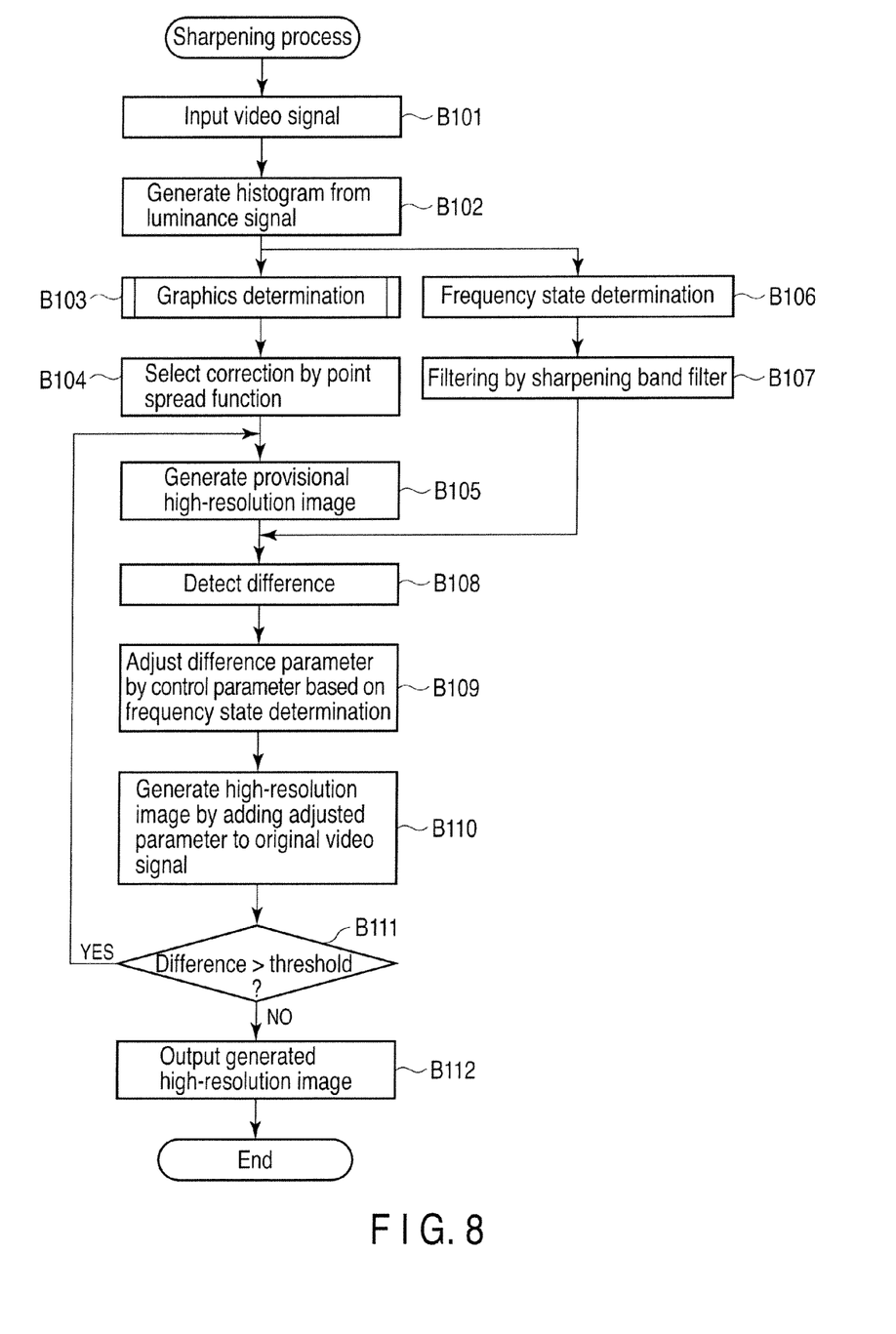
FIG. 8 is an exemplary flowchart illustrating an example of the procedure of a sharpening process by the video processing apparatus according to the embodiment.

FIG. 8 is the flowchart illustrating an example of the procedure of the sharpening process by the sharpening processor 108, with use of the processing result by the histogram generator 104.

To start with, a video signal is input to the histogram generator 104 and the sharpening processor 108 (block B101). A luminance signal (Y) 101a in the video signal 101 is input to the histogram generator 104. The video signal 101 is input to the sharpening processor 108.

Then, the histogram generator 104 generates a histogram from the input luminance signal (Y) 101a with respect to each of frames, based on the luminance level of pixels (block B102). Specifically, the histogram generator 104 calculates the number of pixels at each luminance level by counting pixels of each frame, which is included in the luminance signal (Y) 101a, with respect to each luminance level.

The graphics determination module 119 determines whether the video signal is a captured video or a graphics video, based on the calculated number of pixels (histogram) at each luminance level (block B103). The procedure of the graphics determination process by the graphics determination module 119 will be described later with reference to the flowchart of FIG. 9.

Based on the result of graphics determination, the correction-by-point-spread-function selector 113 selects a point spread function (imaging model function) for correction (block B104). Specifically, if the control parameter 120 is indicative of "OFF" of graphics determination (if the video signal is determined to be a captured video), the correction-by-point-spread-function selector 113 sets a point spread function, in which an imaging blur is considered, for the imaging model function for correction. On the other hand, if the control parameter 120 is indicative of "ON" of the graphics determination (if the video signal is determined to be a graphics video), the correction-by-point-spread-function selector 113 sets a point spread function, in which no imaging blur is considered, for the imaging model function for correction.

Based on the imaging model function set by the correction-by-point-spread-function selector 113, the provisional high-resolution image generator 111 corrects the image retained by the high-resolution image generator 114, and generates a provisional high-resolution image (block B105). The high-resolution image, which is retained by the high-resolution image generator 114, is, in the initial state, the image by the input video signal.

In parallel with the process from block B103 to block B105, the frequency state determination module 105 detects the frequency state of the input luminance signal (Y) 101a by using the histogram of each frame, which is generated by the histogram generator 104 (block B106). Specifically, based on the frequency distribution of the luminance signal (Y) 101a, the frequency state determination module 105 generates a filter control parameter 106 for extracting from the video signal a component that is to be subjected to sharpening, and a sharpening effect control parameter (effect gain/minute signal coring control signal) 107 for determining the sharpening effect. The frequency state determination module 105 outputs the calculated filter control parameter 106 to the sharpening band filter 109, and outputs the sharpening effect control parameter 107 to the parameter adjuster 121.

Based on the filter control parameter 106 input from the frequency state determination module 105, the sharpening band filter 109 extracts from the video signal 101 an AC component that is to be subjected to sharpening (block B107). The sharpening band filter 109 outputs the extracted AC component to the difference detector 110.

Then, the difference detector 110 generates a difference parameter 112 indicative of a difference between the provisional high-resolution image, which is generated by the provisional high-resolution image generator 111, and the AC component which is extracted by the sharpening band filter 109 (block B108). The difference detector 110 outputs the generated difference parameter 112 to the parameter adjuster 121.

The parameter adjuster 121 adjusts the difference parameter 112, which is generated by the difference detector 110, by using the sharpening effect control parameter 107 which is generated by the frequency state determination module 105

(block B109). The parameter adjuster 121 outputs the adjusted parameter 115 to the high-resolution image generator 114.

The high-resolution image generator 114 adds the parameter 115 to the original video signal, and generates a high-resolution image (block B110). The high-resolution image generator 114 determines whether the difference, which is detected by the difference detector 110, is greater than a threshold (block B111). If the difference is greater than the threshold (YES in block B111), the process returns to block B105. If the difference is not greater than the threshold (NO in block B111), the high-resolution image generator 114 outputs the generated high-resolution image (block B112).

Figure 9:
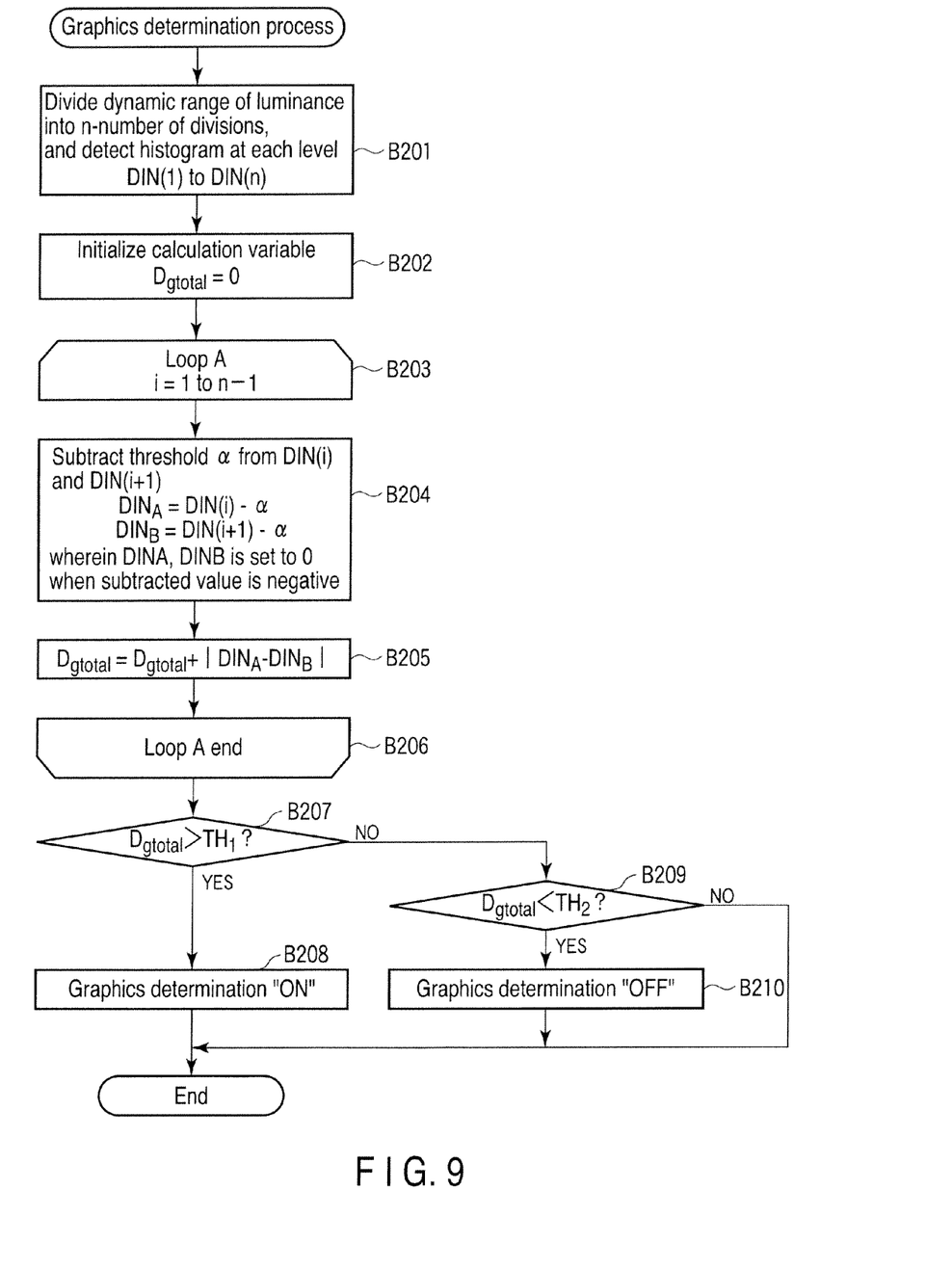
FIG. 9 is an exemplary flowchart illustrating an example of the procedure of a graphics determination process by the video processing apparatus according to the embodiment.

FIG. 9 is the flowchart illustrating an example of the procedure of the graphics determination process corresponding to block B103 in the flowchart of FIG. 8. The graphics determination module 119 determines whether the video signal, which is input to the television receiver 11, is a captured video or a graphics video. The graphics determination module 119 sets the graphics determination to be "OFF" if the input video signal is a captured video, and sets the graphics determination to be "ON" if the input video signal is a graphics video.

To start with, the graphics determination module 119 divides the dynamic range of luminance into an n-number of divisions, and generates a histogram based on an n-number of luminance levels (block B201). The graphics determination module 119 calculates the numbers of pixels, DIN(1) to DIN(n), at the respective luminance levels by counting pixels of each frame, which is included in the luminance signal (Y) 101a, with respect to each luminance level.

Subsequently, the graphics determination module 119 initializes the variable $D_{gtotal}$ used for determination (block B202). The graphics determination module 119 sets 0 for $D_{gtotal}$.

Then, the graphics determination module 119 sets 1 for the variable i for a repetitive loop process (loop A) (block B203). The variable i can take a value in the range of 1 to n−1.

The graphics determination module 119 calculates $DIN_A$ and $DIN_B$, which are obtained by subtracting a threshold α from DIN(i) and DIN(i+1) (block B204). If $DIN_A$ is a negative value, the graphics determination module 119 sets 0 for $DIN_A$. Similarly, if $DIN_B$ is a negative value, the graphics determination module 119 sets 0 for $DIN_B$. Then, the graphics determination module 119 sets a value, which is obtained by adding the absolute difference between the $DIN_A$ and $DIN_B$ to the variable $D_{gtotal}$, for the variable $D_{gtotal}$ (block B205).

Subsequently, the graphics determination module 119 determines whether the variable i is (n−1) or more (block B206). If the variable i is less than (n−1), the graphics determination module 119 adds 1 to the variable i, and executes the process of loop A (block B203 to block B206) once again.

If the variable i is (n−1) or more, the graphics determination module 119 finishes the process of loop A. Then, the graphics determination module 119 determines whether $D_{gtotal}$ is greater than threshold $TH_1$ (block B207). If $D_{gtotal}$ is greater than threshold $TH_1$ (YES in block B207), the graphics determination module 119 sets the graphics determination to be "ON" (block B208).

If $D_{gtotal}$ is not greater than threshold $TH_1$ (NO in block B207), the graphics determination module 119 determines whether $D_{gtotal}$ is less than threshold $TH_2$ (block B209). If $D_{gtotal}$ is less than threshold $TH_2$ (YES in block B209), the graphics determination module 119 sets the graphics determination to be "OFF" (block B210). If $D_{gtotal}$ is not less than threshold $TH_2$ (NO in block B209), the graphics determination module 119 maintains the graphics determination result relating to an immediately preceding video frame. At this time, if the frame (current frame) that is the target of processing is the first frame of the video signal, the graphics determination is set to be "OFF". Specifically, the initial value of the graphics determination is set to be "OFF".

By the above-described process, the graphics determination module 119 determines whether the input video signal is a captured video or a graphics video. The graphics determination module 119 sets graphics determination to be "OFF" if the input video signal is a captured video, and sets graphics determination to be "ON" if the input video signal is a graphics video. The sharpening processor 108 changes (switches) the imaging model function in accordance with the graphics determination, and executes a proper sharpening process (reconstruction process) to the input video signal. Specifically, if the graphics determination is "OFF" (if the input video signal is a captured video), the sharpening processor 108 sets a point spread function, in which an imaging blur is considered, for the imaging model function, and executes the sharpening process. If the graphics determination is "ON" (if the input video signal is a graphics video), the sharpening processor 108 sets a point spread function, in which no imaging blur is considered, for the imaging model function, and executes the sharpening process. The image quality of the input video signal can be enhanced by subjecting the input video signal to the sharpening process corresponding to the characteristic of the input video signal.

Figure 10:
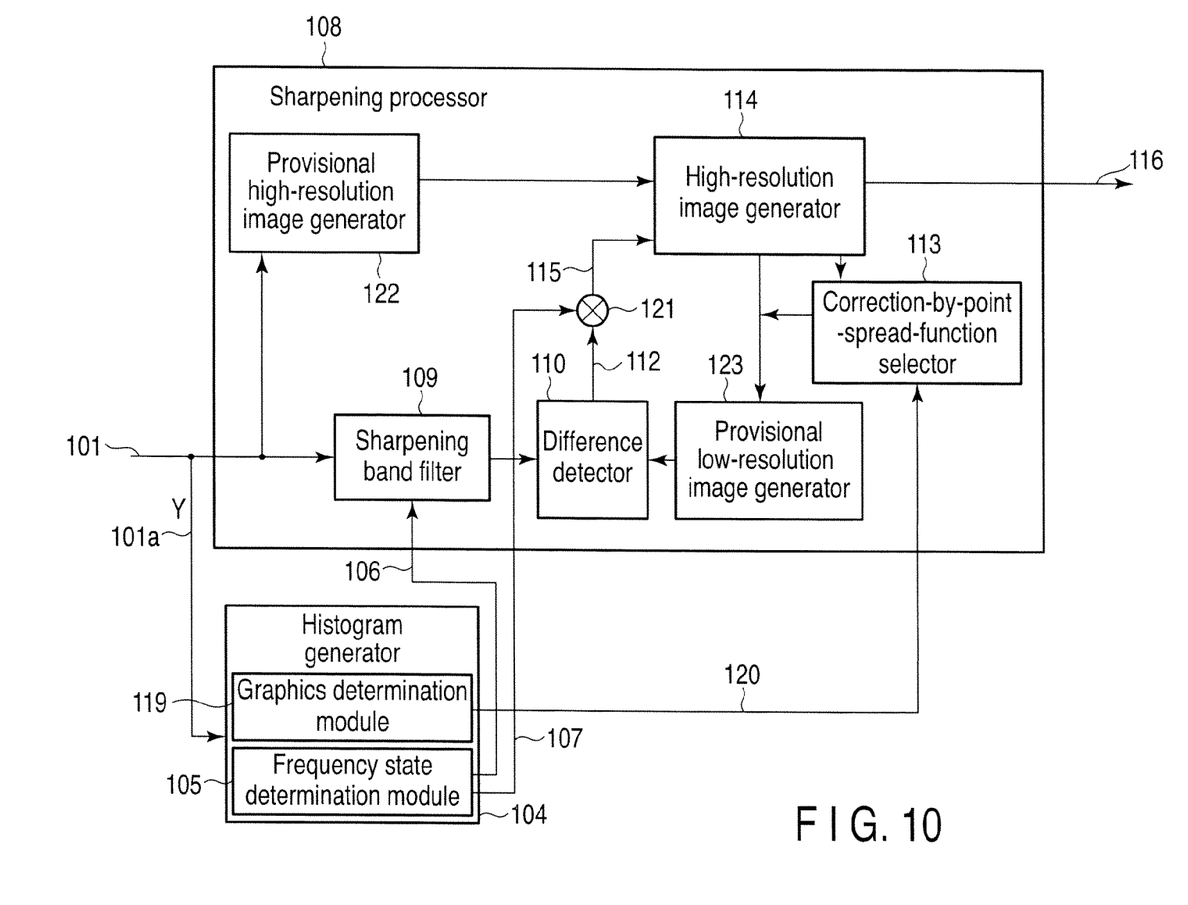
FIG. 10 is an exemplary block diagram showing the structure of a sharpening processor and a histogram generator which are provided in a modification of the video processing apparatus of the embodiment.

FIG. 10 is a block diagram showing the structure of the histogram generator 104 and sharpening processor 108 according to a modification of the video processing apparatus of the embodiment. The sharpening processor 108 according to the modification of the embodiment has a function of up-converting an input video signal. For example, this function is used at the time of converting quasi-high-resolution video, for instance, SD video such as DVD video, or video of terrestrial digital broadcast, to high-resolution video. Thus, in the modification of the embodiment, an up-convert process (scaling process) is executed on the input video signal, and the up-converted video signal is sharpened. The sharpening processor 108 in the modification of the embodiment further includes a provisional high-resolution image generator 122, and substitutes a provisional low-resolution image generator 123 for the provisional high-resolution image generator 111 shown in FIG. 2.

The provisional high-resolution image generator 122 up-converts the input video signal. The provisional high-resolution image generator 122 converts the input video signal of a first resolution (low-resolution image) to a video signal (high-resolution image) of a second resolution which is higher than the first resolution. The provisional high-resolution image generator 122 outputs the up-converted video signal to the high-resolution image generator 114.

The provisional low-resolution image generator 123 corrects and down-converts, based on the imaging model function, the high-resolution image output from the high-resolution image generator 114. The provisional low-resolution image generator 123 converts, by the down-convert, the high-resolution image of the second resolution to the low-resolution image of the first resolution. The provisional low-resolution image generator 123 outputs the down-converted image (video signal) to the difference detector 110.

The difference detector 110 generates a difference parameter 112 indicative of a difference between the provisional low-resolution image generated by the provisional low-resolution image generator 123, and the AC component extracted by the sharpening band filter 109. The difference detector 110 outputs the generated difference parameter 112 to the parameter adjuster 121.

The parameter adjuster 121 adjusts the difference parameter 112 generated by the difference detector 110, by using the sharpening effect control parameter 107 generated by the frequency state determination module 105, and generates a parameter 115. The parameter adjuster 121 outputs the generated parameter 115 to the high-resolution image generator 114.

The high-resolution image generator 114 adds the parameter 115 to the original video signal 101. The high-resolution image generator 114 outputs a video signal 116 sharpened by the above-described process.

Figure 11:
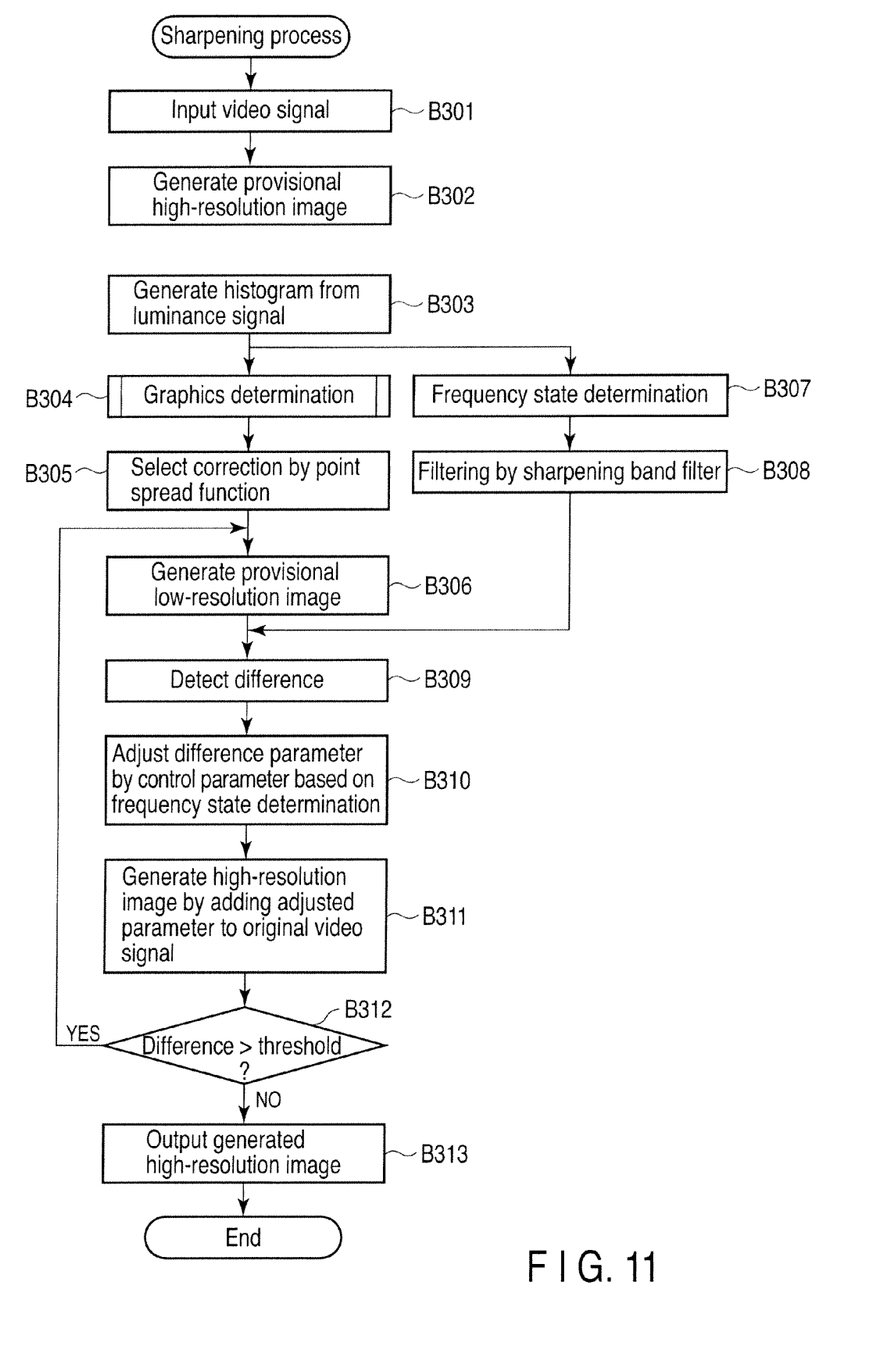
FIG. 11 is an exemplary flowchart illustrating an example of the procedure of a sharpening process by the video processing apparatus shown in FIG. 10.

FIG. 11 is the flowchart illustrating an example of the procedure of the sharpening process according to the modification of the video processing apparatus of the embodiment shown in FIG. 10.

To start with, the signal processor 51 and video processor 62 input a video signal to the histogram generator 104 and the sharpening processor 108 (block B301). The signal processor 51 inputs a luminance signal (Y) 101a in the video signal 101 to the histogram generator 104. The video processor 62 inputs the video signal 101 to the sharpening processor 108.

Subsequently, the provisional high-resolution image generator 122 up-converts the video signal and generates a provisional high-resolution image (block B302). The provisional high-resolution image generator 122 outputs the up-converted video signal to the high-resolution image generator 114.

The histogram generator 104 generates a histogram from the input luminance signal (Y) 101a with respect to each of frames, based on the luminance level of pixels (block B303). Specifically, the histogram generator 104 calculates the number of pixels at each luminance level by counting pixels of each frame, which is included in the luminance signal (Y) 101a, with respect to each luminance level.

The graphics determination module 119 determines whether the video signal is a captured video or a graphics video, based on the calculated number of pixels at each luminance level (histogram) (block B304). The procedure of the graphics determination process by the graphics determination module 119 has been described above with reference to the flowchart of FIG. 9.

Based on the result of graphics determination, the correction-by-point-spread-function selector 113 selects a point spread function (imaging model function) for use in correction (block B305). Specifically, if the control parameter 120 is indicative of "OFF" of the graphics determination (if the video signal is determined to be a captured video), the correction-by-point-spread-function selector 113 sets a point spread function, in which an imaging blur is considered, for the imaging model function for correction. On the other hand, if the control parameter 120 is indicative of "ON" of the graphics determination (if the video signal is determined to be a graphics video), the correction-by-point-spread-function selector 113 sets a point spread function, in which no imaging blur is considered, for the imaging model function for correction.

The provisional low-resolution image generator 123 generates a provisional low-resolution image by subjecting the image, which is retained by the high-resolution image generator 114, to correction and down-convert based on the imaging model function set by the correction-by-point-spread-function selector 113 (block B306). The high-resolution image, which is retained by the high-resolution image generator 114, is, in the initial state, the provisional high-resolution image input from the provisional high-resolution image generator 122. The resolution of the provisional low-resolution image, which is generated by the provisional low-resolution image generator 123, is equal to the resolution of the original video signal (input video signal).

In parallel with the process from block B304 to block B306, the frequency state determination module 105 detects the frequency state of the input luminance signal (Y) 101a by using the histogram of each frame, which is generated by the histogram generator 104 (block B307). Specifically, based on the frequency distribution of the luminance signal (Y) 101a, the frequency state determination module 105 generates a filter control parameter 106 for extracting from the video signal a component that is to be subjected to sharpening, and a sharpening effect control parameter (effect gain/minute signal coring control signal) 107 for determining the sharpening effect. The frequency state determination module 105 outputs the calculated filter control parameter 106 to the sharpening band filter 109, and outputs the sharpening effect control parameter 107 to the parameter adjuster 121.

Based on the filter control parameter 106 input from the frequency state determination module 105, the sharpening band filter 109 extracts from the video signal 101 an AC component that is to be subjected to sharpening (block B308). The sharpening band filter 109 outputs the extracted AC component to the difference detector 110.

Then, the difference detector 110 generates a difference parameter 112 indicative of a difference between the provisional low-resolution image generated by the provisional low-resolution image generator 123, and the AC component extracted by the sharpening band filter 109 (block B309). The difference detector 110 outputs the generated difference parameter 112 to the parameter adjuster 121.

The parameter adjuster 121 adjusts the difference parameter 112 generated by the difference detector 110, by using the sharpening effect control parameter 107 generated by the frequency state determination module 105 (block B310). The parameter adjuster 121 outputs the adjusted parameter 115 to the high-resolution image generator 114.

The high-resolution image generator 114 adds the parameter 115 to the original video signal 101, and generates a high-resolution image (block B311). The high-resolution image generator 114 determines whether the difference detected by the difference detector 110 is greater than a threshold (block B312). If the difference is greater than the threshold (YES in block B312), the process returns to block B306. If the difference is not greater than the threshold (NO in block B312), the high-resolution image generator 114 outputs the generated high-resolution image (block B313).

By the above-described process, the video processing apparatus according to the modification of the embodiment executes the up-convert process on the input video signal (low-resolution image) and executes sharpening on the up-converted video signal, thereby generating the high-resolution image. In the sharpening process, the sharpening processor 108 switches the imaging model function in accordance with the graphics determination, and executes a proper sharpening process (reconstruction process) to the input video signal. The video processing apparatus according to the modification of the embodiment can enhance the image quality by increasing the resolution of the input video signal and executing the sharpening process corresponding to the characteristic of the input video signal.

In the present embodiment, the description has been given of the example in which the histogram generator 104 is provided in the signal processor 51, and the sharpening processor 108 is provided in the video processor 62. Alternatively, the histogram generator 104 and the sharpening processor 108 may be provided in the signal processor 51.

As has been described above, according to the present embodiment, the image quality process corresponding to the characteristic of video can be performed. The graphics determination module 119 determines whether the video signal is a captured video or a graphics video. The graphics determination module 119 sets graphics determination to be "OFF" if the input video signal is a captured video, and sets graphics determination to be "ON" if the input video signal is a graphics video. The sharpening processor 108 switches the imaging model function in accordance with the graphics determination, and executes a proper sharpening process (reconstruction process) to the input video signal. Thereby, the user can view video subjected to a proper image quality process in accordance with the characteristic of the input video signal, that is, the characteristic of video content.

The above-description has been given of the example in which the imaging model function is switched by determining whether the input video signal is a captured video or a graphics video. However, imaging model functions may be set based on not only the captured video and a graphics video, but also more finely classified characteristics (contents) of video.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing apparatus comprising:
   a histogram generating module configured to generate a histogram based on a luminance level of pixels of a video signal;
   a determination module configured to determine whether the video signal is a video signal of captured video based on the histogram; and
   a sharpening module configured to sharpen the video signal based on a point spread function in which a blur due to imaging is considered, if the video signal is the video signal of captured video, and to sharpen the video signal based on a point spread function in which a blur due to imaging is not considered, if the video signal is not the video signal of captured video.

2. The video processing apparatus of claim 1, wherein the histogram generating module is configured to calculate a number of pixels of each of frames of the video signal at each of luminance levels, and
   the determination module is configured to calculate absolute values of differences between numbers of pixels of neighboring luminance levels, based on the calculated number of pixels at each of the luminance levels, to calculate a sum of the calculated absolute values with respect to each of the frames, and to determine that the video signal is not the video signal of captured video, if the calculated sum is greater than a first threshold.

3. The video processing apparatus of claim 2, wherein the sharpening module is configured to change the point spread function based on the calculated sum, and to sharpen the video signal based on the changed point spread function.

4. The video processing apparatus of claim 1, wherein the histogram generating module is configured to calculate a number of pixels of each of frames of the video signal at each of luminance levels, and
   the determination module is configured to calculate a subtraction value by subtracting a predetermined value from the calculated number of pixels at each of the luminance levels, to set zero for the subtraction value if the subtraction value is a negative value, to calculate absolute values of differences between subtraction values at neighboring luminance levels, to calculate a sum of the calculated absolute values with respect to each of the frames, and to determine that the video signal is not the video signal of captured video, if the calculated sum is greater than a first threshold.

5. The video processing apparatus of claim 4, wherein the sharpening module is configured to change the point spread function based on the calculated sum, and to sharpen the video signal based on the changed point spread function.

6. The video processing apparatus of claim 1, further comprising a scaling module configured to generate a video signal of a second resolution which is higher than a first resolution by generating new pixel values from a video signal of the first resolution,
   wherein the sharpening module is configured to sharpen the video signal of the second resolution.

7. A video processing apparatus comprising:
   a determination module configured to determine whether a video signal is a video signal of graphics video; and
   a sharpening module configured to sharpen the video signal based on a point spread function in which a blur due to imaging is considered, if the video signal is not determined to be the video signal of graphics video, and to sharpen the video signal based on a point spread function in which a blur due to imaging is not considered, if the video signal is determined to be the video signal of graphics video.

8. The video processing apparatus of claim 7, wherein the determination module is configured to determine whether the video signal is the video signal of graphics video, based on program information added to the video signal.

9. The video processing apparatus of claim 8, further comprising a histogram generating module configured to generate a histogram based on a luminance level of pixels of the video signal,
   wherein the determination module is configured to determine whether the video signal is the video signal of graphics video, based on at least one of the program information and the histogram.

10. The video processing apparatus of claim 9, wherein the histogram generating module is configured to calculate the number of pixels of each of frames of the video signal at each of luminance levels, and
    the determination module is configured to calculate absolute values of differences between the numbers of pixels of neighboring luminance levels, based on the calculated number of pixels at each of the luminance levels, to calculate a sum of the calculated absolute values with respect to each of the frames, and to set a first threshold at a low value if the program information indicates that the video signal is the video signal of graphics video, to set the first threshold at a high value if the program information indicates that the video signal is not the video signal of graphics video, and to determine that the video signal is the video signal of graphics video, if the calculated sum is greater than the first threshold.

11. The video processing apparatus of claim 7, wherein the sharpening module is configured to vary a degree of an effect of sharpening, based on a determination result obtained by the determination module.

12. A video processing apparatus comprising:
a selecting module configured to select whether a video signal is a video signal of animation video; and
a sharpening module configured to sharpen the video signal based on a point spread function in which a blur due to imaging is considered, if the video signal is not selected as the video signal of animation video, and to sharpen the video signal based on a point spread function in which a blur due to imaging is not considered, if the video signal is selected as the video signal of animation video.

13. A video processing method comprising:
generating a histogram based on a luminance level of pixels of a video signal;
determining whether the video signal is a video signal of captured video based on the histogram; and
sharpening the video signal based on a point spread function in which a blur due to imaging is considered, if the video signal is the video signal of captured video, and sharpening the video signal based on a point spread function in which a blur due to imaging is not considered, if the video signal is not the video signal of captured video.

* * * * *